US008385373B2

(12) United States Patent
Stratford et al.

(10) Patent No.: US 8,385,373 B2
(45) Date of Patent: Feb. 26, 2013

(54) METHOD AND APPARATUS FOR FRAME DETECTION IN A COMMUNICATIONS SYSTEM

(75) Inventors: Scott Stratford, Campbell, CA (US); David Vucich, Cupertino, CA (US)

(73) Assignee: ADC Telecommunications, Inc., Shakopee, MN (US)

( * ) Notice: Subject to any disclaimer, the term of this patent is extended or adjusted under 35 U.S.C. 154(b) by 350 days.

(21) Appl. No.: 12/144,961

(22) Filed: Jun. 24, 2008

(65) Prior Publication Data
US 2009/0316611 A1 Dec. 24, 2009

(51) Int. Cl.
*H04J 3/06* (2006.01)
(52) U.S. Cl. ......................... 370/508; 370/278
(58) Field of Classification Search .................. 370/277, 370/278, 280, 294, 282, 508
See application file for complete search history.

(56) References Cited

U.S. PATENT DOCUMENTS

| | | | | |
|---|---|---|---|---|
| 6,205,133 | B1 * | 3/2001 | Bexten | 370/343 |
| 6,993,084 | B1 * | 1/2006 | Eberlein et al. | 375/260 |
| 7,006,587 | B1 * | 2/2006 | Lewis et al. | 375/365 |
| 2006/0087980 | A1 * | 4/2006 | Ikeda et al. | 370/252 |
| 2007/0201402 | A1 | 8/2007 | Cho et al. | |
| 2007/0230590 | A1 * | 10/2007 | Choi et al. | 375/260 |
| 2007/0230592 | A1 * | 10/2007 | Choi et al. | 375/260 |
| 2008/0062935 | A1 * | 3/2008 | Nakagawa et al. | 370/335 |
| 2009/0185632 | A1 * | 7/2009 | Cai et al. | 375/260 |

FOREIGN PATENT DOCUMENTS

| | | |
|---|---|---|
| KR | 1020050123504 | 12/2005 |
| KR | 1020060057132 | 5/2006 |
| KR | 1020060061013 | 6/2006 |

OTHER PUBLICATIONS

International Searching Authority, "International Search Report", Feb. 9, 2010, Published in: WO.
U.S. Appl. No. 12/144,913, Inventor: Singh et al., Title: System and Method for Configurable Time-Division Duplex Interface, filed Jun. 24, 2008.
U.S. Appl. No. 12/144,939, Inventor: Singh et al., Title: System and Method for Synchronized Time-Division Duplex Signal Switching, filed Jun. 24, 2008.
U.S. Appl. No. 12/144,977, Inventor: Stratford et al., Title: Method and Apparatus for Switching in a TDD System, filed Jun. 24, 2008.
U.S. Appl. No. 12/208,971, Inventor: Stratford et al., Title: Method and Apparatus for Determining an End of a Subframe in a TDD System, filed Sep. 11, 2008.

\* cited by examiner

*Primary Examiner* — Mark Rinehart
*Assistant Examiner* — Matthew Hopkins
(74) *Attorney, Agent, or Firm* — Fogg & Powers LLC (57) ABSTRACT

A method of determining a boundary of a subframe in a time division duplexing (TDD) system is provided. The method detects a power level of a signal on at least one radio frequency, the signal comprising at least one subframe. A time-domain correlation is done on the detected signal with a first reference signal, wherein the first reference signal represents at least one subframe. The location in time of a boundary of the at least one subframe of the detected signal is determined based on the correlation of the detected signal and the first reference signal.

27 Claims, 5 Drawing Sheets

METHOD AND APPARATUS FOR FRAME DETECTION IN A COMMUNICATIONS SYSTEM

CROSS REFERENCE TO RELATED APPLICATIONS

This application is related to the following applications filed on even date herewith, which are hereby incorporated herein by reference: U.S. patent application Ser. No. 12/144,977, entitled "METHOD AND APPARATUS FOR SWITCHING IN A TDD SYSTEM"; U.S. patent application Ser. No. 12/144,939, entitled "SYSTEM AND METHOD FOR SYNCHRONIZED TIME-DIVISION DUPLEX SIGNAL SWITCHING"; and U.S. patent application Ser. No. 12/144,913, entitled "SYSTEM AND METHOD FOR CONFIGURABLE TIME-DIVISION DUPLEX INTERFACE".

BACKGROUND

Communication equipment in a Time-Division Duplexing (TDD) system must be coordinated to switch between uplink and downlink communication at the proper times to enable a properly functioning TDD system. Generally, a host unit coordinates the switching times and the host unit transmits information to wireless terminals regarding the switching times. The wireless terminals use the information to determine when to switch, such that communications from the wireless terminals do not collide with communications from the host unit.

In addition to the host and wireless terminals, equipment within the communication network that relays/transmits information between the host unit and the wireless terminal may also need to switch between uplink and downlink communications. In some systems, this network equipment does not have the circuitry required to properly receive, filter, and decode the information signals from the host unit regarding when to switch between upstream and downstream communication.

SUMMARY

The following summary is made by way of example and not by way of limitation. In one embodiment, a method of determining a boundary of a subframe in a time division duplexing (TDD) system is provided. The method detects a power level of a signal on at least one radio frequency, the signal comprising at least one subframe. A time-domain correlation is done on the detected signal with a first reference signal, wherein the first reference signal represents at least one subframe. The location in time of a boundary of the at least one subframe of the detected signal is determined based on the correlation of the detected signal and the first reference signal.

In accordance with common practice, the various described features are not drawn to scale but are drawn to emphasize specific features relevant to the present disclosure.

DETAILED DESCRIPTION

Figure 1:
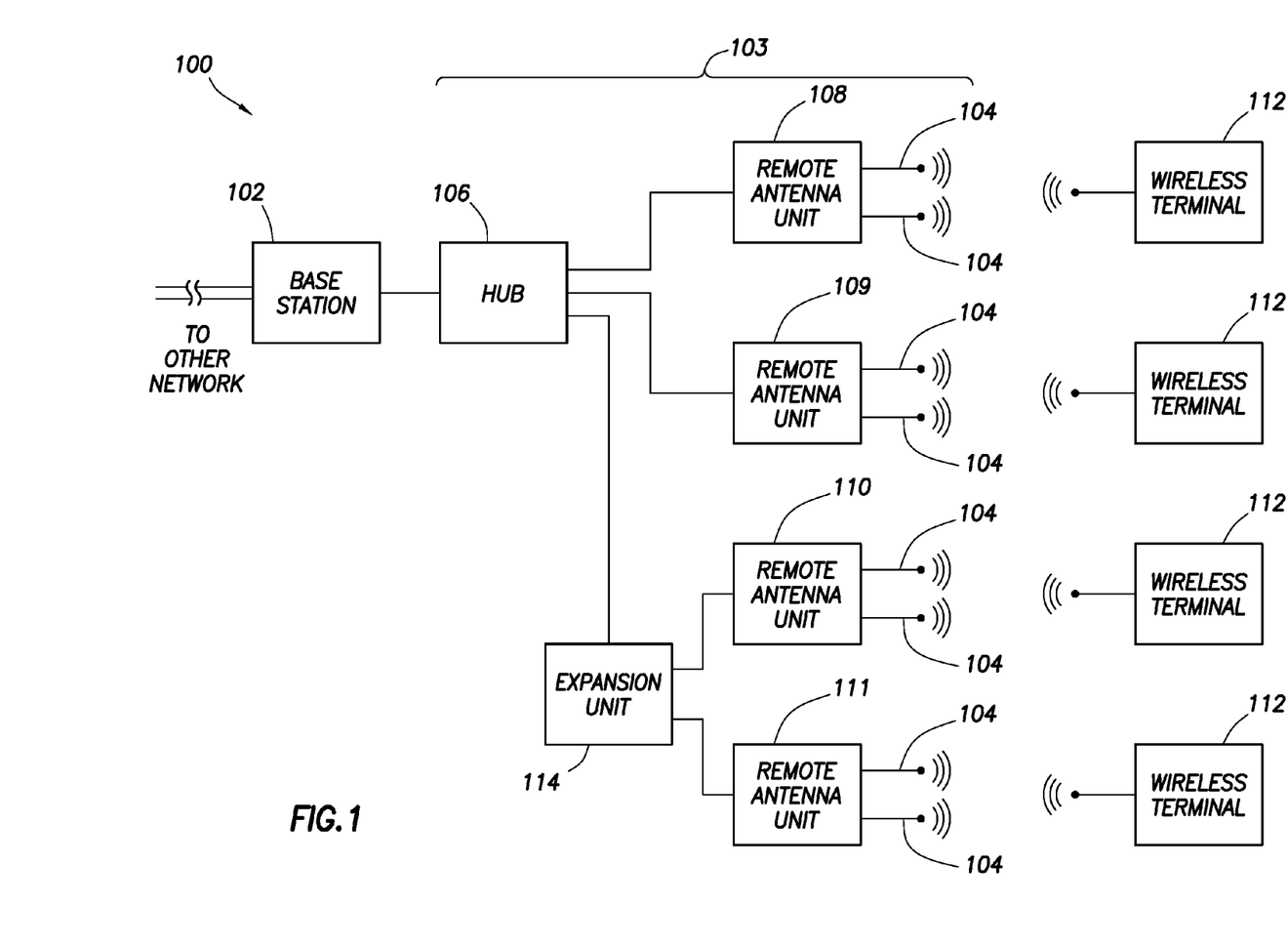
FIG. 1 is a block diagram of one embodiment of a communication system for switching between uplink and downlink transmissions.

FIG. 1 is a block diagram of one embodiment of a communication network 100. In the embodiment shown in FIG. 1, communication network 100 comprises a base station 102 which is communicatively coupled to a distributed antenna system (DAS) 103. In other embodiments, DAS 103 is used to transport radio frequency signals between one or more upstream devices (for example, base station transceiver 102, wireless access points, or other sources of radio frequency signals) and one or more downstream wireless devices (for example, wireless terminals 112). In some embodiments, base station transceiver 102 (also referred to herein as "base station" 102) is a part of a telecommunication-service providers' infrastructure and wireless terminals 112 comprise customer premise equipment. In general, for each radio frequency signal or channel over which base station 102 communicates with a downstream wireless terminal 112, an original downlink radio frequency signal is originally transmitted by base station 102 for reception by one or more wireless terminals 112 and an original uplink radio frequency signal is originally transmitted by a wireless terminal 112 for reception by base station 102.

Base station 102 manages communication among wireless terminals 112, and between wireless terminals 112 and other communication networks (not shown) that are coupled to base station 102. In one embodiment, base station 102 manages communication between wireless terminals 112 and a public switched telephone network (PSTN). In this embodiment, for example, communication network 100 is a cellular/PCS system and base station 102 communicates with a base station controller which acts as a voice/PSTN gateway to the PSTN. In another embodiment, base station 102 manages communication between wireless terminals 112 and an internet protocol (IP)-based network (such as the internet) via communication with an IP gateway. In this embodiment, base station 102 performs baseband processing on IP data from an IP gateway and places the IP data onto a channel. In one embodiment, base station 102 is an IEEE 802.16 compliant base station. Optionally, base station 102 may also meet the requirements of WiMax, WiBro, LTE, or other consortium. In yet other embodiments, base station 102 comprises multiple functionalities including managing communications between both a PSTN and an IP-based network.

DAS 103 comprises a hub 106 communicatively coupled to base station 102, and three remote antenna units 108-111 located remotely from and communicatively coupled to hub 106. Each remote antenna unit 108-111 includes one or more antennas 104 which are used to communicate wirelessly with wireless terminals 112. In this embodiment, hub 106 is optically coupled to base station 102, although in other embodiments, hub 106 and base station 102 are communicatively coupled by coaxial cables, wireless antennas, or other communication medium. Similarly, in this embodiment, hub 106 is optically coupled to each remote antenna unit 108-111, although in other embodiments, hub 106 and remote antenna units 108-111 are communicatively coupled by coaxial cables, wireless antennas, or other communication medium. In this embodiment, each of remote antenna units 108-111 includes two antennas 104, a primary antenna and a diversity antenna; although in other embodiments only a single antenna 104 or more than two antennas 104 are used at each remote antenna unit 108-111. In one embodiment, DAS 103 also includes one or more expansion units 114 that are communicatively coupled between hub 106 and remote antenna units 110, 111 to, for example, provide coverage for each floor of a multi-floor building.

Base station 102 uses DAS 103 to communicate with wireless terminals 112 via antennas 104. Bidirectional communication between base station 102 and the plurality of wireless terminals 112 is accomplished through use of a multiple access scheme. In one embodiment, base station 102 and wireless terminals 112 communicate using a code-division multiple access (CDMA) scheme. In another embodiment, base station 102 and wireless terminals 112 communicate using an orthogonal frequency division multiple access (OFDMA) scheme. In other embodiments, other multiple access schemes are used (e.g. TDMA, FDMA), or more than one multiple access scheme is used including, for example, CDMA for voice communications and OFDMA for data communications.

In one embodiment, some or all communications between base station 102 and wireless terminals 112 use a time division duplex (TDD) communication scheme. TDD schemes enable bi-directional communication between two devices by having uplink transmissions (from wireless terminal 112 toward base station 102) and downlink transmissions (from base station 102 toward wireless terminal 112) occur at different times. In this embodiment, both uplink and downlink communications share the same frequencies.

Although in the embodiment shown in FIG. 1, a single base stations 102 and hub 106 are shown, it should be understood that in other embodiments a plurality of base stations 102 and/or hubs 108 are used. Additionally, although in this embodiment a certain number of remote antenna units 108-111 are coupled to hub 106, in other embodiments other numbers of remote antenna units 108-111 are coupled to hub 106.

The following description is directed towards a system based on the TDD scheme described in the IEEE 802.16 standard, however, it should be understood that the scope of the present disclosure is intended to include other embodiments, with appropriate adjustments, modifications, and substitutions to the systems and methods described for application to other TDD schemes.

System 100 enables communication between wireless terminals 112 and one or more other devices which are communicatively coupled to base station via, for example, a PSTN or internet based network. Wireless terminals 112 transmit/receive signals to/from remote antenna units 108-111 via remote antennas 104. In this embodiment, wireless terminals 112 each communicate with one remote antenna unit 108-111 at a time, except for during certain situations, for example during handoffs. For example, information which is outgoing from a wireless terminal 112 is transmitted by the wireless terminal 112 and received at, for example, remote antenna unit 108 which is communicating with the transmitting wireless terminal 112. Remote antenna unit 108 reproduces the signal received from wireless terminal 112 and sends the signal along with other signals received from other wireless terminals 112 transmitting to remote antenna unit 104 to hub 106. Hub 106 receives information from remote antenna unit 108 (and other remote antenna units 109-111, some through expansion unit 114) reproduces the signals received and sends the signals to base station 102. Base station 102 processes the information and transmits the information toward its destination. Incoming information from another network is received by base station 102. Base station 102 determines which of wireless terminals 112 is the destination of the information, generates, modulates, and transmits a signal containing the information to hub 106. Hub 106 receives the signal, reproduces the signal, and sends the signal to, for example, remote antenna unit 108 which is in communication with the destination wireless terminal 112. Remote antenna unit 108 receives the signal from hub 106, reproduces the signal, and sends the signal wirelessly to wireless terminal 112, where in the information is received and processed. In this embodiment, for both uplink and downlink communications, hub 106 and remote antenna units 108-111 do not demodulate or unpack the signals transmitted by base station 102 and wireless terminals 112. Instead hub 106 and remote antenna units 108-111 act as relays, receiving and reproducing the signals received while performing only minimal processing on the signals.

Figure 2:
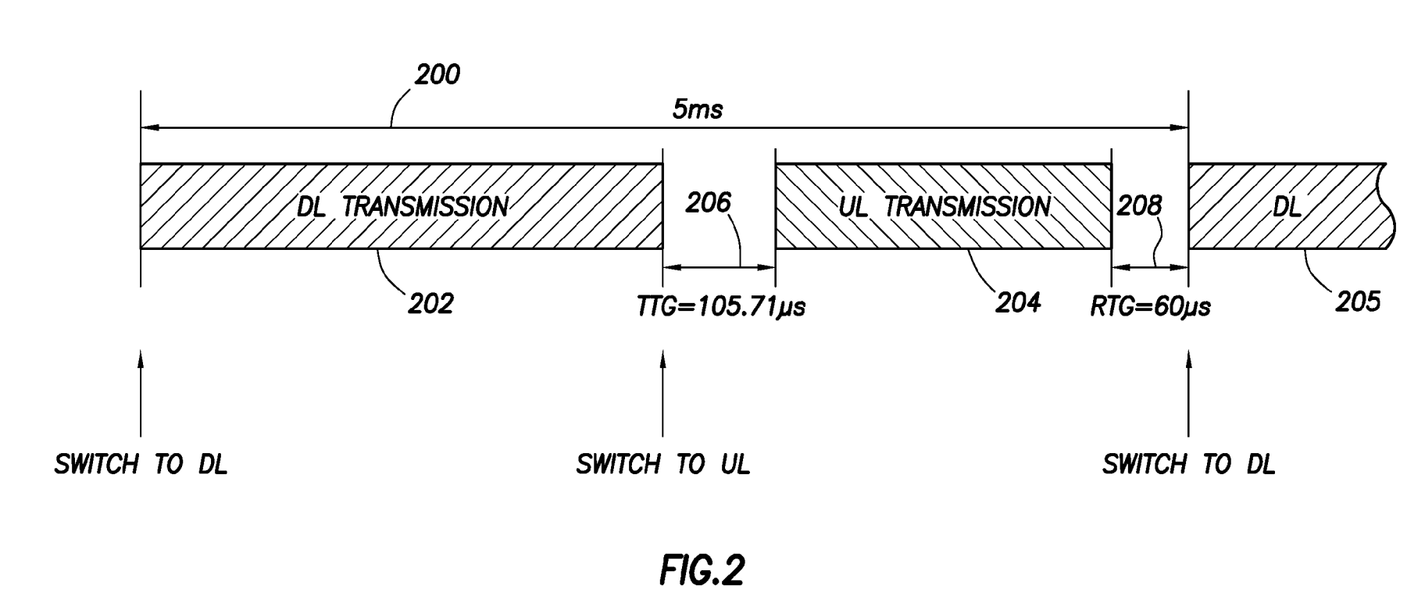
FIG. 2 is a diagram of one embodiment of a frame structure.

FIG. 2 illustrates one example of a TDD transmission structure 200. In the embodiment illustrated in FIG. 2, transmission structure 200 comprises a frame (also referred to herein at "frame" 200) having a downlink (DL) subframe 202 followed by an uplink (UL) subframe 204. A portion of a second downlink subframe 205 of a subsequent TDD frame is also shown. Each start or end of a transmission is referred to herein as a transmission boundary. In this embodiment, each TDD frame 200 is substantially similar in structure having a 5 ms fixed duration and containing one downlink subframe followed by one uplink subframe. In some embodiments, a portion of TDD frame 200 is allocated for control data. In other embodiments, TDD frame 200 may have a variable duration, and/or multiple uplink or downlink subframes may be included within each frame 200. Additionally, other embodiments may have an uplink subframe first which is followed by a downlink subframe, or a variation across frames between uplink and downlink subframes starting each frame.

The beginning portion of TDD frame 200 is allocated to downlink subframe 202. At the end of the downlink subframe 202, a time gap (TTG) 206 occurs before the start of uplink subframe 204. Then, uplink subframe 204 begins, and another time gap (RTG) 208 occurs between the end of uplink subframe 204 and the beginning of the subsequent downlink subframe 205 of the next frame.

During downlink subframe 202, base station 102 is transmitting to one or more of wireless terminals 112. During uplink subframe 204 one or more of wireless terminals 112 are transmitting to base station 102. TTG 206 between downlink subframe 202 and uplink subframe 204 allows time for base station 102 to switch from transmit to receive mode and for each wireless terminal 112 to switch from receive to transmit mode. Likewise, RTG 208 allows time for base station 102 to switch from receive to transmit mode and wireless terminals 112 to switch from transmit to receive mode. TTG 206 and RTG 208 also allow time margin for such things as base station/mobile synchronization and propagation delay determination/adjustment.

In addition to base station 102 and wireless terminals 112, the RF circuitry within DAS 103 also switches between processing downlink transmissions and uplink transmissions. Similar to base station 102 and wireless terminals 112, the switching of the RF circuitry within DAS 103 occurs during time gaps TTG 206 and RTG 208. The RF circuitry within hub 106 as well as RF circuitry within each remote antenna unit 108-111 performs the uplink and downlink switching.

In one embodiment, each frame 200 has the same duty cycle, such that the duration of downlink subframe 202 and uplink subframe 204 are fixed. In an alternative embodiment, the duty cycle is variable such that the duration of downlink subframe 202 and uplink subframe 204 are variable on a frame-by-frame basis. For a variable duty cycle, the subframe durations are dynamically assigned during transmission based on system traffic, user preferences, or other parameters. For example, in one embodiment, frame 200 has 47 total frames and has predetermined downlink subframe lengths of 35, 34, and 33 symbols, and uplink subframe lengths of 12, 13, and 14 symbols as allowed by the communications protocol. A 35 symbol downlink subframe 202 corresponds to a 12 symbol uplink subframe 204. Regardless of the number of symbols in each subframe, the total number of uplink and downlink symbols remains at 47. Thus, if there are fewer symbols in a downlink subframe 202, there will be more symbols in the corresponding uplink subframe 204. In this embodiment, regardless of whether frames 200 are fixed or variable duty cycles, the time periods for TTG 206 and RTG 208 have a fixed duration.

Although in this embodiment, the communication structure used by system 100 is a frame which comprises two subframes as illustrated in FIG. 2, it should be understood that the scope of the present disclose is intended to include other frame/subframe structures and other communication structures as known to those skilled in the art.

Wireless terminals 112 obtain the timing of downlink subframe 202 and uplink subframe 204 from communications sent by base station 102. In one embodiment, these communications occur on a separate control channel and wireless terminals 112 listen to the control channel to obtain the frame and subframe timing. In another embodiment, wireless terminals 112 obtain the frame and subframe timing from messages sent by base station 102 within frame 200 or by listening to current transmissions on the payload channel and ascertaining the timing directly from the transmissions. In any case, wireless terminals 112 determine at what time of each frame 200 begins, when downlink subframe 202 will end, when to switch from receiving mode to transmitting mode, and at what point to start transmitting uplink subframe 204. In this embodiment, however, hub 106 and remote antenna units 108-111 do not have the circuitry required to demodulate and unpack signals transmitted between base station 102 and wireless terminals 112. Thus, in one embodiment, hub 106 and remote antenna units 108-111 have circuitry included for independently determining the timing of the frames and subframes.

Figure 3:
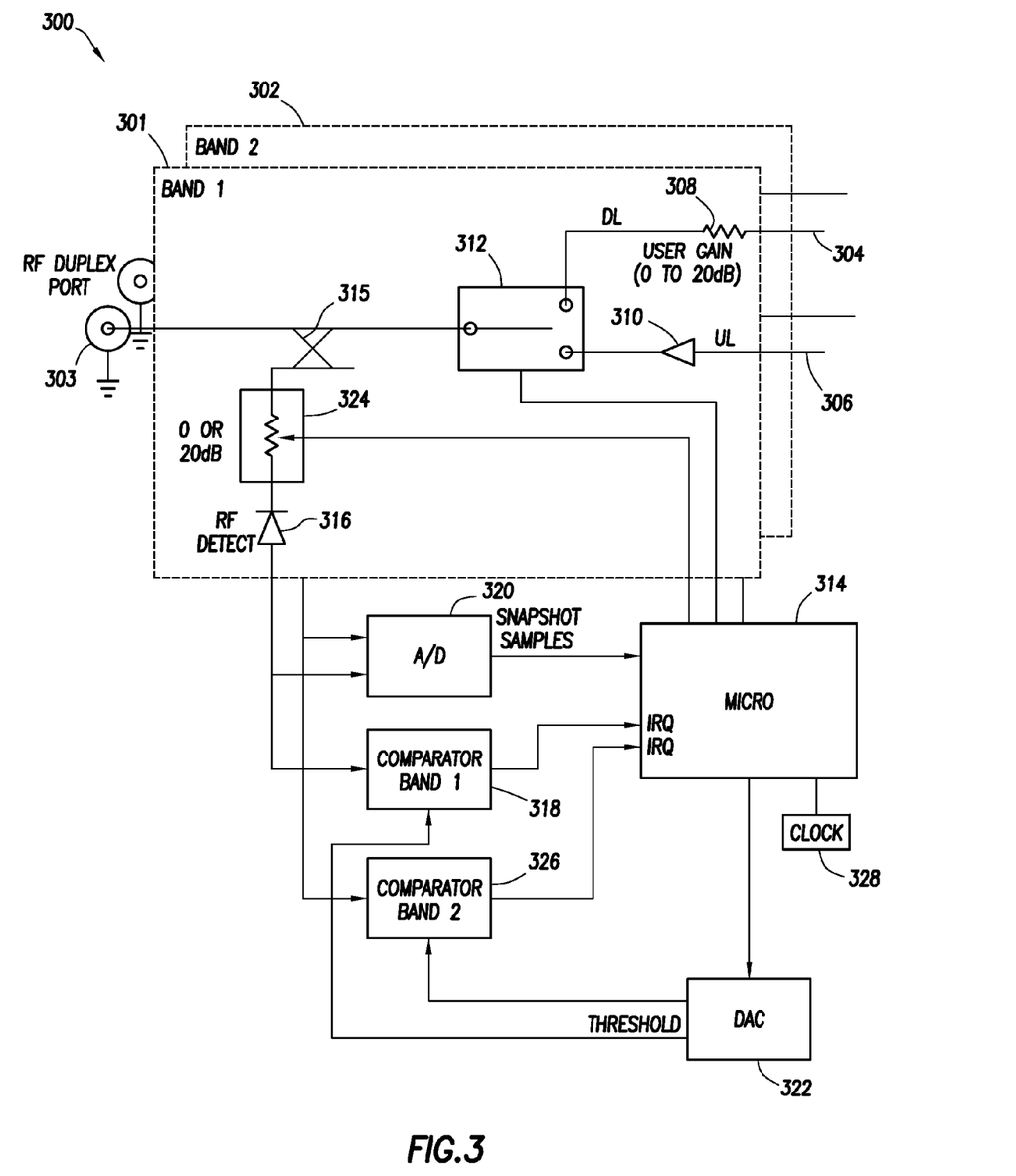
FIG. 3 is a block diagram of one embodiment of a communications circuit for switching between uplink and downlink transmissions.

FIG. 3 illustrates one embodiment of a circuit 300 for determining the location in time of a boundary of a transmission structure in communications network 100. In the embodiment shown in FIG. 3, circuit 300 determines a timing of a subframe boundary (subframe timing) based on the power level of signals that are transmitted within network 100. Based on the determined subframe timing, circuit 300 determines when to switch between downlink and uplink transmission. For example, in this embodiment, circuit 300 determines the location in time of the starting boundary for downlink subframe 202. In this embodiment, determining the starting time of downlink subframe 202 also determines the start time of frame 200, because the start of downlink subframe 202 coincides with the start of frame 200. Circuit 300 then determines when to switch from uplink transmission to downlink transmission based on the determined starting boundary of downlink subframe 202.

Circuit 300 detects signals currently being transmitted on network 100 (for example, between base station 102 and other wireless terminals not shown) and compares the power level of the detected signals with a known reference signal to determine the timing of a subframe boundary. In one embodiment, the comparison is a correlation with a reference signal which comprises a signal having a power level matching an expected power level and duration of a received downlink subframe. More detail regarding the correlation process is provided below. In this embodiment, since each frame is of the same duration, circuit 300 uses the determined timing of the start of a detected frame to predict the start of subsequent frames. Circuit 300 then determines when to set switch 312 to relay downlink transmission based on the predicted start time of the upcoming frame. Thus, circuit 300 is set to downlink mode to relay downlink transmissions from base station 102 to wireless terminals 112 in accordance with the frame and subframe timing of network 100. As is evident from the description above, the apparatuses and methods described herein can be used to determine the frame and/or subframe timing of a system as desired.

In one embodiment, along with the start of downlink subframe 202, the start of uplink subframe 204 is also predicted from the determined timing of the start of a frame. For example, when the frame duty cycle is fixed, the start of uplink subframe 204 is fixed relative to start of frame 200. Once the location in time of the start of a frame is determined, the start of subsequent frames as well as the start of the uplink subframes within those frames is predicted based on the known frame duration and the known time between the start of frame and the start of the uplink subframe within that frame.

In another embodiment, the frame duty cycle is variable, and the start of uplink subframe 204, varies across frames based on the duty cycle of each particular frame. Here, frame timing is determined as described above, and the start of downlink subframe 202 is thus known because the start of downlink subframe 202 coincides with the start of frame 200. The start of uplink subframe 202 is determined by detecting the falling edge of downlink subframe 202 in real-time and switching from downlink mode to uplink mode based on the detected falling edge. More detail regarding real-time switching based on a falling edge of a subframe is provided in co-pending application Ser. No. 12/144,977 titled "METHOD AND APPARATUS FOR SWITCHING IN A TDD SYSTEM" which is herby incorporated herein by reference.

In one embodiment, both hub 106 and remote antenna units 108-111 comprise circuits such as circuit 300 to determine when to switch between uplink and downlink transmission modes. In an alternative embodiment, circuit 300 is included only within hub 106. Here, hub 106 determines the switching times for itself, as well as remote antenna units 108-111, and forwards control signals indicating the time for switching to remote antenna units 108-111 as described in co-pending application Ser. No. 12/144,939, entitled "SYSTEM AND METHOD FOR SYNCHRONIZED TIME-DIVISION DUPLEX SIGNAL SWITCHING" which is hereby incorporated herein by reference.

In the embodiment shown in FIG. 3, circuit 300 processes the signals of two frequency bands. Circuit 301 processes signals of a first frequency band and circuit 302 processes signals of a second frequency band. In this embodiment, circuit 301 and 302 are similar, with the exception of minor differences to enable each circuit 301, 302 to support its respective frequencies. Thus, only circuit 301 is described in detail. In other embodiments, only one frequency band is supported. In still other embodiments, more than two frequency bands are supported.

On circuit 301 signals are transmitted and received to/from base station 102 at RF duplex port 303. Signals to/from wireless terminals 112 are transmitted and received at downlink (DL) port 304 and uplink (UL) port 306 respectively. Downlink port 304 and uplink port 306 are coupled to one or more antennas 104 which transmit and receive wireless signals from wireless terminals 112. A variable resistor 308 controls the power of downlink signals transmitted from downlink port 304. On the uplink side, an amplifier 310 amplifies signals received from wireless terminals 112 for further processing and transmission to base station 102. A switch 312 switches circuit 300 between uplink transmission (uplink mode) and downlink transmission (downlink mode) by coupling RF duplex port 303 to either downlink port 304 or uplink port 306. In the embodiment shown in FIG. 3, switch 312 is a single pole, double throw switch having one common connection (coupled to duplex port 303) and two switched connections (coupled to downlink port 304 and uplink port 306 respectively). In an alternative embodiment, port 303 comprises two simplex ports which operate as a duplex port. More detail regarding the configuration of circuit 300 and port 303 as simplex or duplex is provided in co-pending application Ser. No. 14/144,913, entitled "SYSTEM AND METHOD FOR CONFIGURABLE TIME-DIVISION DUPLEX INTERFACE", which is hereby incorporated herein by reference.

Figure 4:
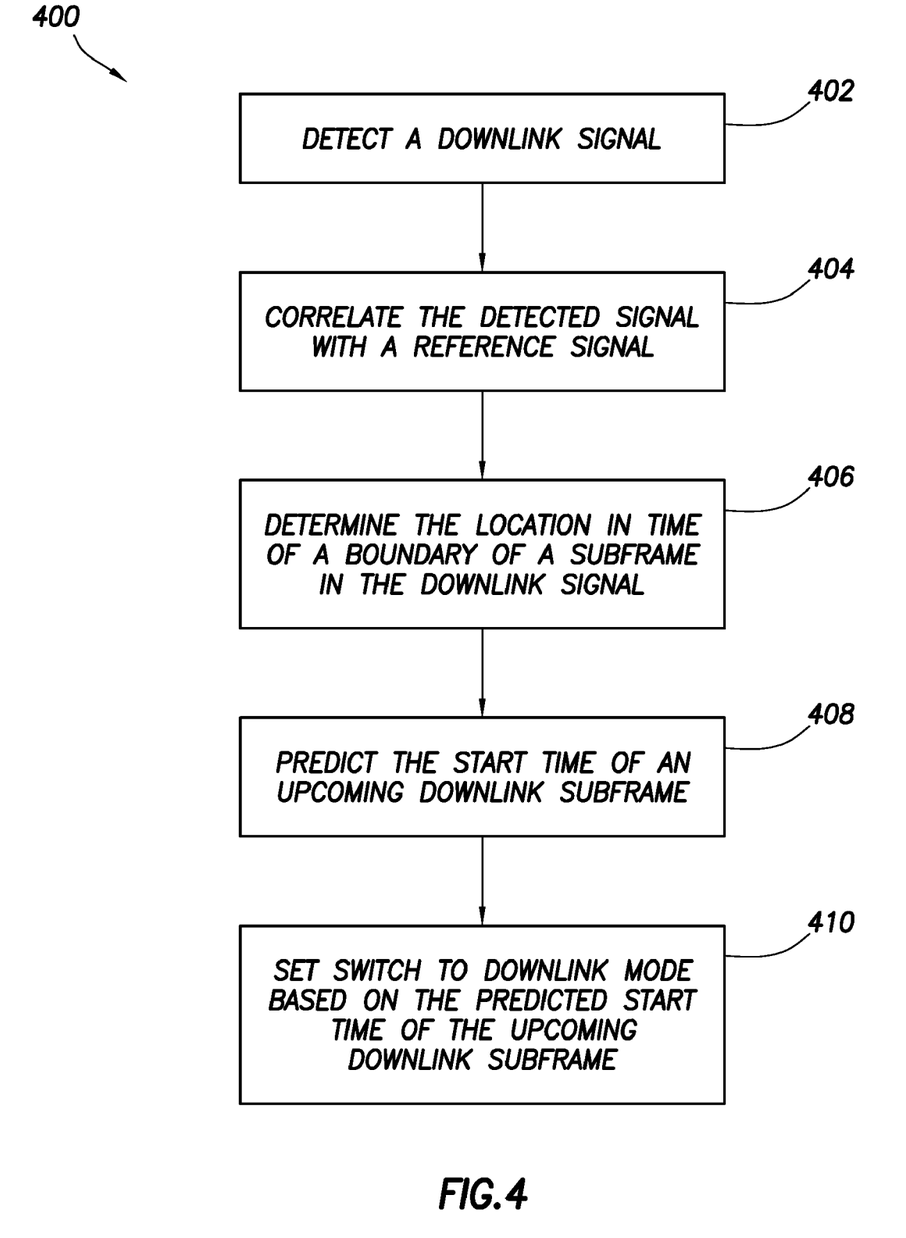
FIG. 4 is a flow chart illustrating one embodiment of a method of switching between uplink and downlink transmissions.

Referring now to FIG. 4, one embodiment of a method 400 for determining the subframe timing of a signal is disclosed. The following discussion relates to determining the timing of downlink subframe 202, however, it should be understood that the methods and apparatus described herein could also be used with appropriate adjustments and modifications to determine the timing of uplink subframe 204.

Method 400 begins at block 402 where the power level of a downlink signal is detected. At block 404, the detected signal is correlated with a reference signal and, at block 406, the location in time of a boundary of a subframe in the detected downlink signal is determined from the correlation. At block 408, the start time of subsequent downlink subframes are predicted based on the determined start time of the detected downlink subframe. Then, at block 410, switch 312 is set to downlink mode in time for the start of an upcoming downlink subframe.

At block 402, downlink signals received at RF duplex port 303, and a coupler 315 couples the downlink signal to an RF detector 316. In this embodiment, coupler 315 is located upstream of switch 312. Additionally, in this embodiment, RF detector 316 is a root-mean-squared (RMS) detector. Prior to the downlink signal reaching RF detector 316, the signal is attenuated by attenuator 324 if necessary. More detail regarding attenuator 324 is provided below. RF detector 316 measures the power of the downlink signal, and an analog to digital (A/D) converter 320 reads the power level measured by RF detector 316. A/D converter 320 converts the power level from RF detector 316 into digitized samples ("snapshot samples") for microprocessor 314. Microprocessor 314 records the time in which each sample was collected and collects samples for a period of time such that an entire downlink subframe 202 is detected. In one embodiment, the samples are collected for a minimum of slightly more than one frame period based on the number of samples in the reference signal. In one embodiment, to reduce the chance of an uplink subframe being coupled into RF detector 316, switch 312 remains in the downlink position throughout the detection by RF detector 316.

At block 404, microprocessor 314 correlates the detected samples with a reference signal. The reference signal is a representation of a valid downlink subframe 202. In other words, the reference signal is a representation of a detected downlink subframe 202 comprising a number of symbols that is a valid subframe length. As explained in more detail below, microprocessor 314 determines the start of downlink subframe 202 based on the results of the correlation between the detected samples and the reference signal.

In one embodiment, the correlation is a time-domain correlation that compares the reference signal to the detected samples by overlapping the detected samples and the reference signal, multiplying each detected sample by the value that is overlapped in the reference signal. The correlation result for this first point in time is then computed by summing all the products of the multiplication together. The reference signal is then time shifted relative to the received samples, and the multiplication and summation is repeated to obtain a correlation result for this second point in time. This process is repeated to obtain time varied correlations between the reference signal and the detected samples.

At block 406, microprocessor 314, determines the frame timing from the correlation results. For example, in one embodiment where system 100 uses a fixed duty cycle frame, the correlation at block 404 between the reference signal and the detected samples results in a correlation peak at a single point in time. The correlation peak occurs where the reference signal and the received samples align in time. A single correlation peak occurs because the subframe length of the detected subframe is the same as the subframe length of the reference signal. Since the subframe length in a fixed duty cycle system is fixed and known, the reference signal is made to represent a subframe having the same length as the subframes used by the system. Thus, there is one point in time at which the reference signal and the detected signal align. At block 406, microprocessor 314 determines the start time of the received downlink subframe based on the knowledge of the time in which the samples were detected, and the determination of the point in time at which the detected samples were aligned with the reference signal.

In another embodiment, system 100 uses frames having variable duty cycles. Here, the correlation of block 404 may result in a correlation plateau where multiple points in time are tied for the highest correlation. This is because the subframe length of the detected subframe is unknown, and therefore, the reference signal may not match the length of the detected subframe. When the detected subframe has a different length than the subframe of the reference signal there is not a single correlation peak when correlating with a reference signal as described with respect to fixed duty cycle frames above.

To correlate a frame having an unknown duty cycle, the reference signal is correlated with both the maximum subframe length expected to be detected and the minimum subframe length expected to be detected. In one embodiment, the maximum and minimum expected subframe lengths are the maximum and minimum valid subframe lengths allowed by the communication protocol.

In one embodiment, the detected samples are correlated with both the maximum subframe length and the minimum subframe length, by performing two correlations. One correlation is with a first reference signal having the longest subframe length and a second correlation is with a second reference signal having the shortest subframe length. In this embodiment, the start of the downlink subframe in the first reference signal is aligned with the start of downlink subframe in the second reference signal and then the first and second reference signals are correlated with the detected signal. Similar to above, the correlation is a time-domain correlation where the detected signal is correlated against a reference signal at a first point in time and then time shifted and re-correlated at the second point in time, as so on. The correlation result with the first reference signal at each point in time is summed with the correlation result with the second reference signal at the corresponding point in time to obtain a composite correlation result for each point in time. The composite correlation results form a correlation peak at the highest overall correlation with the first and second reference signals. At block 406, microprocessor 314 determines the start of the downlink subframe based on the composite correlation results.

In yet another embodiment of block 404, instead of performing two correlations as described above, a single correlation is performed which includes both the maximum expected subframe length and the minimum expected subframe length. A single composite reference signal is created by adding the first reference signal and the second reference signal together and the detected signal is correlated with the composite reference signal. Then, at block 406, microprocessor 314 determines the start time of the received downlink subframe based on the correlation.

In one embodiment of block 404, correlation is performed over a plurality of downlink subframes 202. Here, a plurality of downlink subframes 202 are detected by RF detector 316, sampled by A/D converter 320, and sent to microprocessor 314. Microprocessor 314 performs correlation of each downlink subframe with the reference signal(s) as described above, or correlates the downlink subframes with a lengthened reference signal comprising the number of downlink subframes detected. Since multiple subframes are correlated, multiple correlation peaks result (one peak per downlink subframe).

In one embodiment of block 406, to determine the timing of the start of a subframe when correlating over a plurality of subframes, the time value is extracted from each peak, and the peak time values for each frame are sorted. As an example, in one embodiment, the median peak time value is selected as the start of downlink subframe.

In an alternative embodiment of block 406, the correlation results for each frame are added coherently, to produce composite correlation results having a single peak and a length of one frame. Here coherent summation means that point 1 of frame 1 is added to point 1 of frame 2 and point 2 of frame 1 is added to point 2 of frame 2, and so on. The time value is then extracted from the single composite peak. Here, in on embodiment, an initial estimate of the peak location is made prior to coherently summing the correlation results for the frames, and the peak of each frame is moved to the center of the frame prior to summation. In one embodiment, the initial estimate of the peak location is made by extracting the time value from each peak, sorting the peak time values, and choosing the median value of the sorted values as describer in the previous paragraph.

In one embodiment, as correlation of the detected signal is performed over time, a window is used to narrow the range of time over which the correlation is performed. Here, after initially performing correlation over a long amount of time, the timing information is estimated and subsequent correlations are performed over smaller window of time. This can reduce the processing power required to perform the correlation. For example, in one embodiment, correlation is initially performed for a window of one frame length. After three correlations are performed, the timing information relating to the peak from the previous correlations is used to estimate the peak location of subsequent frames. Correlations performed on the subsequent frames are performed over a window having a length of 5% of the frame length. In one embodiment, the reduced window size is determined based on the amount of drift experienced to reduce the likelihood of missing the peak of the frame being sampled with the reduced window. In one embodiment, when the window length is decreased the sample rate is increased to increase resolution for the window samples. In one embodiment, the window size and sample rate are variable and are dynamically updated based on system parameters (for example, the current drift calculation) as correlations are performed over time. More detail regarding the determination of drift is provided below.

Regardless of how the correlation is performed, once microprocessor 314 determines the start time of the detected downlink subframe, the start time of subsequent downlink subframes is predicted at block 408 based on the duration of each frame. For example, if the start of the received downlink subframe is determined to be at time 104 of clock 328, and 25,000 ticks of clock 328 is equal to the duration of one frame, the start of the frame immediately subsequent to the frame detected (and thus the start of the subsequent frame's downlink subframe) is at time 25,104 of clock 328. In this way, clock 328 is used to maintain the frame timing for circuit 300.

At block 410, microprocessor 314 uses the timing information to set switch 312 to downlink mode (coupling signals from RF duplex port 303 to downlink port 304) in time for the start of downlink subframe 202. In one embodiment, the timing information is used to discipline the phase of clock 328 such that switch 312 is set to downlink mode in time for the start of downlink subframe 202. In another embodiment, the timing information is used to adjust a counter within microprocessor 314 that is used to determine the start of a downlink subframe. For example, a counter within microprocessor 314 continuously counts down, and is set to a value at the start of each frame such that the counter reaches zero when it is time to set switch 312 to downlink mode for the start of the next frame. Once the counter reaches zero, the counter is reloaded with the same value.

Although in the embodiments described above, the start time of a subframe was determined, in other embodiments, the end time of a downlink subframe is determined, or other points within a frame/subframe are determined. For example, in one embodiment, circuit 300 determines the end of uplink subframe 204 by detecting uplink signals and correlating the detected signals with an uplink reference signal.

Figure 5:
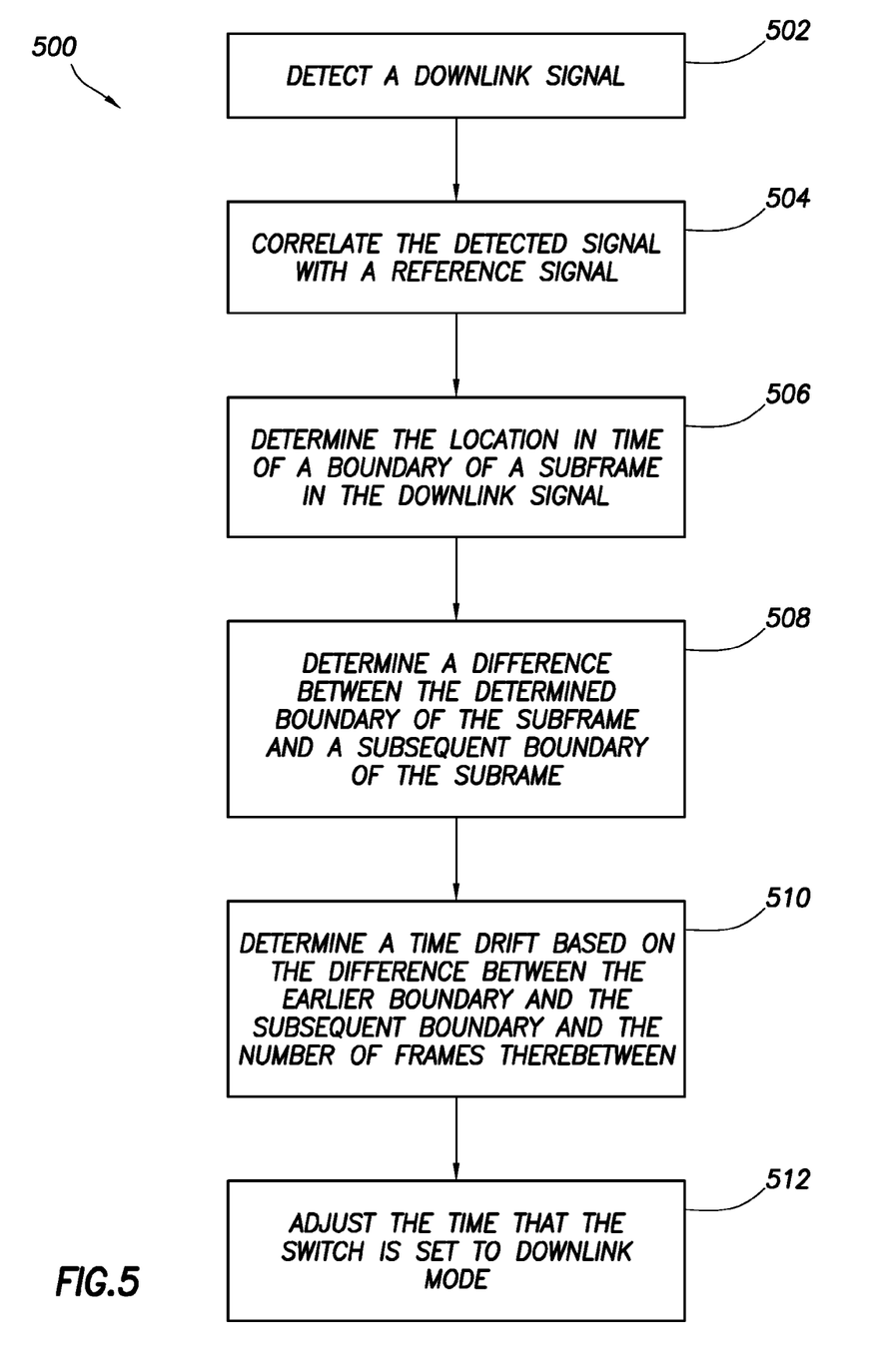
FIG. 5 is a flow chart illustrating one embodiment of a method of adjusting a time of switching between uplink and downlink transmissions to account for time drift.

Referring now to FIG. 5, one embodiment of adjusting circuit 300 to account for time drift is shown. Time drift occurs, for example, because of differences between the frequency of clock 328 and the frequency of the received signal. To account for time drift, measurements of the frame/subframe timing are made and adjustments to circuit 300 are made if necessary.

Method 500 begins by detecting the downlink signal (502), correlating the downlink signal with a reference signal (504), and determining the location in time of a boundary of a subframe in the downlink signal (506). Blocks 502, 504, and 506 of FIG. 5 are similar to blocks 402, 404, and 406 of FIG. 4, and are not re-described herein in detail. Once the location in time of a frame boundary has been determined, microprocessor 314, at block 508, compares the determined frame boundary with a subsequent frame boundary (for example, as determined by method 400) to determine a difference between the predicted frame boundary and the determine frame boundary. In one embodiment, the comparison at block 508 first determines a first time offset for the earlier frame. A second time offset is also determined for the subsequent frame. The time offsets are the determined from a single reference point in time. Thus, the two offsets can be compared to determine the difference in time between the earlier subframe boundary and the subsequent subframe boundary. At block 510, the difference between the subsequent frame boundary and the earlier frame boundary along with the duration of time since the frame detection of the subsequent frame boundary determination is used to determine the time drift. The number of frames between the earlier subframe and the subsequent subframe are determined, and the difference between the earlier frame and the subsequent frame is divided by the number of frames to determine the drift across those frames. At block 512, microprocessor 314 adjusts the time that switch 312 is set to incorporate the time drift.

For example, in one embodiment of adjusting circuit 300 to account for time drift, the counter within microprocessor 314 is adjusted. Here, time drift is measured by re-determining the frame timing after the counter for microprocessor 314 is initially set for the frame timing as discussed with respect to method 400. The re-determined frame timing is then used to determine a difference between the re-determined frame timing and the counter predicted frame timing. This difference along with the amount of time since the counter was set is used to adjust the counter to account for time drift. For example, if the counter was set 10 frames previous to the time drift measurement and the time drift measurement found the equivalent of ½ a tick of clock 328 difference between the counter and the actual frame timing, the counter is adjusted such that the value stored in counter is one count higher than normal every twenty frames to account for the ½ tick error in the counter.

In another embodiment of adjusting circuit 300 to account for time drift, the phase of clock 328 is adjusted in a similar manner to account for time drift. In yet another embodiment, the frequency of clock 328 is adjusted based on the measured time drift, such that the frequency of clock 328 is closer to the frequency of the received signals.

In one embodiment, the time drift is measured periodically during the operation of circuit 300, and the counter or clock 328 are updated as needed to account for changes in the time drift. In one embodiment, when periodically measuring time drift, the duration between time drift measurements is set based on the accuracy of the frequency of clock 328 to the signal frequency. Thus, the larger the frequency difference between clock and the transmitted signals, the shorter the duration is between time drift measurements.

In one embodiment, the time drift is measured from the same set of samples as the initial frame timing determination of method 400. Here, blocks 508, 510, and 512 are performed after blocks 402, 404, 406 and 408 and either before, after, or with block 410. In fact, in one embodiment, only one adjustment is made to the counter or clock 328 such that block 512 and 410 are included as the same step. For the frame timing determination blocks 402, 404, 406, samples are taken across multiple frames. The samples are split into two sections. The first section is used as a reference for determining the initial frame timing as discussed with respect to method 400. Then, the time drift is calculated using the second section as discussed with respect to method 500. In one embodiment, if the counter is not updated immediately after the initial frame timing determination, the amount of time that has elapsed during the second section and the time at which the counter is actually updated is also factored in to the counter setting.

In one embodiment, the drift calculations are averaged over a number of calculations to determine the adjustment needed. This reduces the effect of short term variations in the signals and clock.

In one embodiment, the drift calculations are ignored if the calculations are determined to be erroneous. There may be situations in which signals may not be present at a time in which a drift measurement is calculated (for example, bad weather, disconnection of equipment, and others). Drift calculations taken during a time in which no signal is present may result in erroneous measurements, because the drift calculation will be based on noise and not an actual detected subframe. To account for this, in one embodiment, each drift calculation must be above a threshold quality level. Here, each correlation result is normalized by dividing the correlation peak by the average power of the detected signal. This results in a quality metric for the detected signal. This normalized peak is then compared to a threshold of quality. For example, if the normalized peak range is from 0 to 1, in one embodiment, the threshold is selected as 0.7. If the normalized peak is above the threshold, then the drift calculation from that peak is used. If, however, the normalized peak is equal to or below the threshold, then the drift calculation is discarded.

In the embodiment shown in FIG. 3, prior to the downlink signal reaching RF detector 316 and A/D converter 320, the signal is attenuated, if needed, by an attenuator 324. Attenuator 324 reduces the dynamic range required of A/D converter 320 by attenuating the power level of high powered signals, prior to the signals reaching A/D converter 320. Microprocessor 314 controls attenuator 324 based on the power level of signals read by RF detector 316 and A/D converter 320. For example, in this embodiment, the signal range requirements at downlink port 304 are 25 dB. Since RF detection occurs before switch 312, the signal range seen at coupler 315 is an additional 20 dB. Thus, the signal range seen at coupler 315 is approximately 45 dB. Attenuator 324 has an attenuation of 20 dB when enabled and 0 dB when disabled. When signal power levels at coupler 315 are in the top 20 dB of the range expected at coupler 315, microprocessor 314 enables attenuator 324 to reduce the signal levels at RF detector 316 and A/D converter 320 by 20 dB.

In one embodiment, microprocessor 314 determines whether to enable attenuator 324 prior to analyzing the downlink signal to determine the frame/subframe timing as described in methods 400 and 500. To protect RF detector 316 and A/D convert 320, microprocessor 314 initially enables attenuator 324 prior to coupler 315 coupling any signals to attenuator 324, RF detector 316, or A/D converter 320. Microprocessor 314 then determines whether to disable attenuator 324 based on the power level of the signals received. Once attenuator 324 is enabled, A/D converter 320 samples the downlink signal over a number of frames. Microprocessor 314 then receives the power level from A/D converter 320 and compares the power level to an attenuator threshold. If the average power level is below the attenuator threshold, microprocessor 314 disables attenuator 324. If the average power level is equal to or above the attenuator threshold, attenuator 324 remains enabled.

In one embodiment, only the power level of downlink subframe(s) 202 is measured and microprocessor 314 sums the power level of all samples within a fixed number of frames to determine whether to enable/disable the attenuator. The summation value is compared to the threshold which corresponds to an input signal level of between 0 and −5 dBm at RF detector 316. Since microprocessor 314 sums the power level of all the samples, the frame duty cycle factors in to how large the summation value is. In other words, a −25 dBm signal, for example, has two different summation values depending on the duty cycle of the frame. Longer downlink subframes 202 result in a larger summation value and shorter downlink subframes 202 result in a smaller summation value. To account for this in a fixed duty cycle frame, the summation value is normalized by the length of the downlink subframe. For variable duty cycle frames, the length of the downlink subframe is not known or varies over the frames, thus in one embodiment, the threshold power level is normalized by both the longest expected downlink subframe and the shortest expected downlink subframe.

In one embodiment, microprocessor 314 determines the power level of the received signal by correlating the received signal with a reference signal as discussed above and calculating the average signal level from the correlation peaks. For example, for static duty cycle frames, after the correlation is performed across multiple frames, the average signal level is calculated with the equation:

$$Pwr_{Avg} = \frac{Pk_{Avg}}{ns_{fr}}, \text{ where}$$

$Pwr_{Avg}$=Average signal power
$Pk_{Avg}$=Average of correlation peaks of the frames
$ns_{fr}$=Number of A/D converter 320 samples in one frame.

For variable duty cycle frames, after correlation across multiple frames with the shortest subframe length and the longest subframe length, the average signal level is calculated with the equation:

$$Pwr_{Avg} = Pk_{Avg} \frac{N_{SymDLMax} + N_{SymDLMin}}{(N_{SymDLMax} + 3N_{SymDLMin}) \cdot ns_{fr}}, \text{ where}$$

$N_{SymDLMax}$=Number of OFDM symbols (maximum DL subframe length)
$N_{SymDLMin}$=Number of OFDM symbols (minimum DL subframe length).

In one embodiment, for fixed duty cycle frames, the threshold of attenuator 324 is chosen as the expected power level of a sampled downlink subframe taking into account the downlink subframe length. In another embodiment, for variable duty cycle frames, the threshold is chosen as the average expected power level of a sampled downlink subframe with each sample in the frame summed together. The average is the expected power level between the maximum and minimum downlink subframe lengths.

When attenuator 324 is disabled, attenuator 324 is re-enabled when the power level of signals rises to a threshold. In one embodiment, the threshold for re-enabling attenuator 324 is the same as the threshold for disabling as discussed above. In an alternative embodiment, the threshold for re-enabling attenuator 324 is slightly higher than the threshold for disabling attenuator 324 in order to have hysterisis. In one embodiment, there is a 9 dB separation between the two thresholds to ensure hysterisis and compensate for the error in the measured power level for variable duty cycle frames.

Although specific embodiments have been illustrated and described herein, it will be appreciated by those of ordinary skill in the art that any arrangement, which is calculated to achieve the same purpose, may be substituted for the specific embodiments shown. It is manifestly intended that any inventions be limited only by the claims and the equivalents thereof.

What is claimed is:

1. A method of determining a boundary of a transmission structure in a time division duplexing (TDD) system comprising:
    detecting a power level of a radio frequency (RF) signal on at least one radio frequency, the RF signal comprising at least one subframe;
    time-domain correlating the detected power level of the RF signal with a predetermined known first reference signal and with a predetermined known second reference signal, wherein the first reference signal represents at least one subframe; and
    determining a location in time of a boundary of the at least one subframe of the detected RF signal based on the correlation of the detected power level of the RF signal with the first reference signal and the second reference signal;
    wherein time-domain correlating the detected power level of the RF signal with the first and second reference signals further comprises:
    correlating the first reference signal with the detected power level of the RF signal at a first point in time to calculate a correlation result for a maximum subframe overlap;
    correlating the second reference signal with the detected power level of the RF signal at the first point in time to calculate a correlation result for a minimum subframe overlap;
    summing the correlation results for the minimum subframe overlap and the maximum subframe overlap to calculate the correlation of the detected power level of the RF signal for a first point in time; and
    time shifting the first and second reference signals relative to the detected power level of the RF signal.

2. The method of claim 1, wherein the first reference signal is associated with a maximum subframe length expected to be detected and the second reference signal is associated with a minimum subframe length expected to be detected.

3. The method of claim 2, further comprising:
    summing the correlation of the first known reference signal with the correlation of the second reference signal; and
    wherein determining the location in time of a boundary of a subframe determines the location in time of a boundary of a subframe based on the summation of the correlation of the first reference signal and the correlation of the second reference signal.

4. The method of claim 2, wherein determining the location in time of a boundary of a subframe further comprises:
    repeating the steps of: correlating to calculate a correlation result for a minimum subframe overlap, correlating to calculate a correlation result for a maximum subframe overlap, summing the correlation results for the minimum subframe overlap and the maximum subframe overlap, and time shifting, to obtain time varied correlations between the reference signals and detected samples of the power level of the RF signal.

5. The method of claim 1, wherein detecting a power level of an RF signal further comprises:
    detecting a power level of an RF signal comprising a plurality of subframes across a plurality of frames, each subframe having the same position within its respective frame;
    wherein correlating the detected power level of the RF signal with a first reference signal further comprises correlating a power level of each subframe with the first reference signal; and
    determining a frame boundary based on the correlation of each subframe.

6. The method of claim 5, wherein determining the location in time of a boundary of a subframe further comprises:

extracting a time value from a peak of a correlation result for each of the plurality of subframes;
sorting the time values; and
determining the location in time of a boundary of a subframe based on a median of the time values.

7. The method of claim 5, wherein determining the location in time of a boundary of a subframe further comprises:
summing correlation results for each of the plurality of subframes to produce composite correlation results having a length of one frame; and
determining the location in time of a boundary of a subframe based on the composite correlation results.

8. The method of claim 7, further comprising:
extracting a time value from a peak of a correlation result for each of the plurality of subframes;
sorting the time values; and
shifting correlation results such that a median of the time values is centered in each frame prior to summing correlation results for each of the plurality of subframes.

9. A method of switching in a time division duplexing (TDD) system comprising:
detecting a power level of a radio frequency (RF) signal on at least one radio frequency, the RF signal comprising at least one subframe;
time-domain correlating the detected power level of the RF signal with a predetermined known first reference signal, wherein the first reference signal represents at least one subframe;
time-domain correlating the detected power level of the RF signal with a predetermined known second reference signal, wherein the first reference signal is associated with a maximum subframe length expected to be detected and the second reference signal is associated with a minimum subframe length expected to be detected;
determining a location in time of a boundary of the at least one subframe of the detected RF signal based on the correlation of the detected power level of the RF signal with the first reference signal and the second reference signal; and
switching between an uplink communication path and a downlink communication path based on the determination of the location in time of the boundary of a subframe.

10. The method of claim 9, wherein switching between an uplink communication path and a downlink communication path is based on the determination of the location in time of the boundary of a subframe and a frame duration.

11. The method of claim 9, further comprising:
determining a location in time of a subframe boundary of another subframe detected subsequent in time to the at least one subframe;
determining a first time offset based on a reference and the subframe boundary of the at least one frame;
determining a second time offset based on a reference and the subframe boundary of the another subframe;
determining a difference between the first offset and the second offset;
determine a number of frames between the at least one subframe and the another frame;
divide the difference by the number of frames to determine a drift measurement; and
adjusting a timing of switching between an uplink communication path and a downlink communication path based on the drift measurement.

12. The method of claim 11, wherein re-determining a location in time of a subframe boundary is done periodically.

13. An apparatus for switching in a time division duplexing (TDD) system comprising:
a switch having a first port coupled to an uplink communication path, and a second port coupled to a downlink communication path;
a power level detector configured to measure a power level of radio frequency (RF) signals propagating through the switch;
a processing device configured to time-domain correlate a power level of an RF signal detected by the power level detector, and comprising at least one subframe, with a predetermined known first reference signal representing at least one subframe, the processing device configured to control the switch based on the correlation between the detected power level of the RF signal and the first reference signal;
wherein the processing device is further configured to correlate the detected power level of the RF signal with a predetermined known second reference signal, wherein the first reference signal is associated with a maximum subframe length expected to be detected and the second reference signal is associated with a minimum subframe length expected to be detected;
wherein the processing device is further configured to sum the correlation of the first reference signal with the correlation of the second reference signal.

14. The apparatus of claim 13, wherein the processing device is further configured to determine a location in time of a boundary of the at least one subframe based on the correlation of the detected power level of the RF signal with the first reference signal, and to control the switch based on the determination of the location in time of the boundary.

15. The apparatus of claim 14,
wherein the processing device is further configured to determine the location in time of a boundary of the subframe based on the correlation of the detected power level of the RF signal with the first reference signal and the second reference signal.

16. The apparatus of claim 15,
wherein the processing device is further configured to determine the location in time of a boundary of the subframe based on the summation of the first reference signal and the second reference signal.

17. The apparatus of claim 14, wherein the processing device is further configured to set the switch to one of an uplink mode or a downlink mode in time for the start of an upcoming subframe by predicting the start of the upcoming subframe based on the duration of frame and the determined time of the boundary of a subframe.

18. The apparatus of claim 13, wherein the first reference signal is a summation of a predetermined known signal comprising a maximum subframe length expected to be detected and a predetermined known signal comprising a minimum subframe length expected to be detected.

19. The apparatus of claim 13, wherein the power level detector is further configured to detect a power level of a an RF signal comprising a plurality of subframes across a plurality of frames, each subframe having the same position within its respective frame; and wherein the processing device is configured to correlate a power level of each subframe with the first reference signal.

20. The apparatus of claim 13, wherein the processing device is further configured to periodically re-determine the location in time of a subframe boundary and determine a difference between a predicted frame boundary and the re-determined frame boundary; and wherein the processing device is further configured to adjust a timing of setting the switch to one of an uplink mode or a downlink mode based on the determined difference between an predicted frame boundary and the re-determined frame boundary.

21. A distributed antenna system comprising:
at least one hub that is configured to communicate with a base station;
a plurality of remote antenna units communicatively coupled to the at least one hub, wherein the system is configured to communicatively couple signals associated with the base station between the at least one hub and a plurality of wireless terminals;
wherein the at least one hub further comprises:
a switch having a first port coupled to an uplink communication path, and a second port coupled to a downlink communication path;
a power level detector configured to measure a power level of a radio frequency (RF) signal propagating through the switch;
a processing device configured to time-domain correlate the detected power level of the RF signal, the RF signal comprising at least one subframe, with a predetermined known first reference signal representing at least one subframe, the processing device configured to control the switch based on the correlation between the detected power level of the RF signal and the first reference signal;
wherein the processing device is further configured to correlate the detected power level of the RF signal with a predetermined known second reference signal, wherein the first reference signal is associated with a maximum subframe length expected to be detected and the second reference signal is associated with a minimum subframe length expected to be detected;
wherein the processing device is further configured to determine the location in time of a boundary of the subframe based on the correlation of the detected power level of the RF signal with the first reference signal and the second reference signal.

22. The system of claim 21, wherein the processing device is further configured to determine a location in time of a boundary of the at least one subframe based on the correlation of the detected power level of the RF signal with the first reference signal, and to control the switch based on the determination of the location in time of the boundary.

23. The system of claim 21, wherein the processing device is further configured to sum the correlation of the first reference signal with the correlation of the second reference signal; and
wherein the processing device is further configured to determine the location in time of a boundary of the subframe based on the summation of the first reference signal and the second reference signal.

24. The system of claim 22, wherein the processing device is further configured to set the switch to one of an uplink mode or a downlink mode in time for the start of an upcoming subframe by predicting the start of the upcoming subframe based on the duration of frame and the determined time of the boundary of a subframe.

25. The system of claim 21, wherein the first reference signal is a summation of a predetermined known signal comprising a maximum subframe length expected to be detected and a predetermined known signal comprising a minimum subframe length expected to be detected.

26. The system of claim 21, wherein the power level detector is further configured to detect a power level of an RF signal comprising a plurality of subframes across a plurality of frames, each subframe having the same position within its respective frame; and
wherein the processing device is configured to correlate a power level of each subframe with the first reference signal.

27. The system of claim 21, wherein the processing device is further configured to periodically re-determine the location in time of a subframe boundary and determine a difference between a predicted frame boundary and the re-determined frame boundary; and
wherein the processing device is further configured to adjust a timing of setting the switch to one of an uplink mode or a downlink mode based on the determined difference between an predicted frame boundary and the re-determined frame boundary.

* * * * *